(12) United States Patent
Ferran Palau et al.

(10) Patent No.: US 10,355,390 B2
(45) Date of Patent: Jul. 16, 2019

(54) AUTOMATIC OPENING OF A CONNECTOR SELF-CLOSURE SYSTEM

(71) Applicant: Lear Corporation, Southfield, MI (US)

(72) Inventors: Joan Ignasi Ferran Palau, Valls (ES); Josep Maria Pares Caselles, Valls (ES); Ferran Juanes Ribas, Valls (ES); Joan Balana Avila, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/958,514

(22) Filed: Apr. 20, 2018

(65) Prior Publication Data

US 2018/0309222 A1    Oct. 25, 2018

Related U.S. Application Data

(60) Provisional application No. 62/488,415, filed on Apr. 21, 2017.

(51) Int. Cl.
| | |
|---|---|
| *H01R 13/62* | (2006.01) |
| *H01R 13/453* | (2006.01) |
| *B60R 16/023* | (2006.01) |
| *H01R 13/629* | (2006.01) |
| *H01R 24/40* | (2011.01) |

(52) U.S. Cl.
CPC ..... *H01R 13/4536* (2013.01); *B60R 16/0231* (2013.01); *H01R 13/453* (2013.01); *H01R 13/629* (2013.01); *H01R 13/4532* (2013.01); *H01R 24/40* (2013.01)

(58) Field of Classification Search
CPC ............. H01R 23/7026; H05K 7/1053; H05K 7/1023; H05K 7/1084
USPC ...................................... 439/330, 73, 71, 331
See application file for complete search history.

(56) References Cited

U.S. PATENT DOCUMENTS

| | | | |
|---|---|---|---|
| 5,716,224 A | 2/1998 | Masuda et al. | |
| 6,217,341 B1 * | 4/2001 | Glick | G01R 1/0433 439/66 |
| 6,739,894 B2 * | 5/2004 | Ogura | H01R 13/2421 439/330 |
| 6,764,222 B1 | 7/2004 | Szilagyi et al. | |

(Continued)

FOREIGN PATENT DOCUMENTS

CN           2355448 Y      12/1999

*Primary Examiner* — Phuong Chi T Nguyen
(74) *Attorney, Agent, or Firm* — Brooks Kushman P.C.

(57) ABSTRACT

In at least one embodiment, a connector assembly for being positioned on a vehicle is provided. The connector assembly includes first and second connector portions. The first connector portion defines a first and second channels. Each of the first and second channels are positioned on opposite sides of the first connector portion. The first connector portion includes a first contact member and a second contact member. The second connector portion includes a first shutter and a second shutter positioned on an outer surface of the second connector portion. Each of the first shutter and the second shutter are configured to receive the first contact member and the second contact member, respectively. Each of the first and second shutters pivot about an axis in response to receiving the first contact member and the second contact member, respectively, to enable the first connector portion to mate with the second connector portion.

18 Claims, 8 Drawing Sheets

(56) References Cited

U.S. PATENT DOCUMENTS 7,086,880 B2     8/2006   Uchida
8,083,547 B2   12/2011   Roth et al.

* cited by examiner

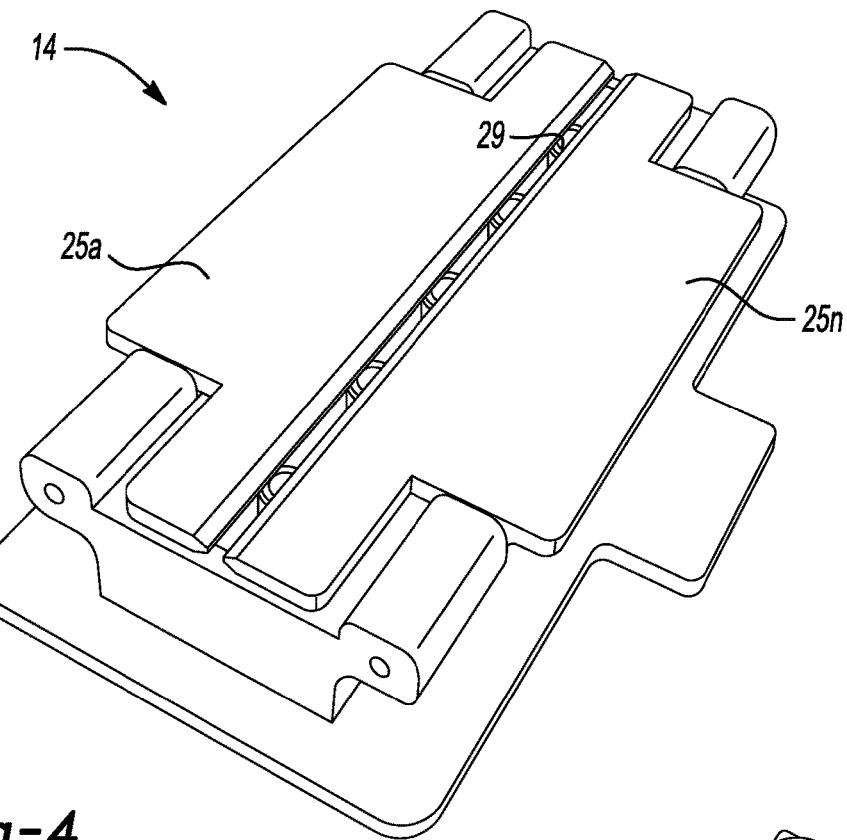
Fig-4
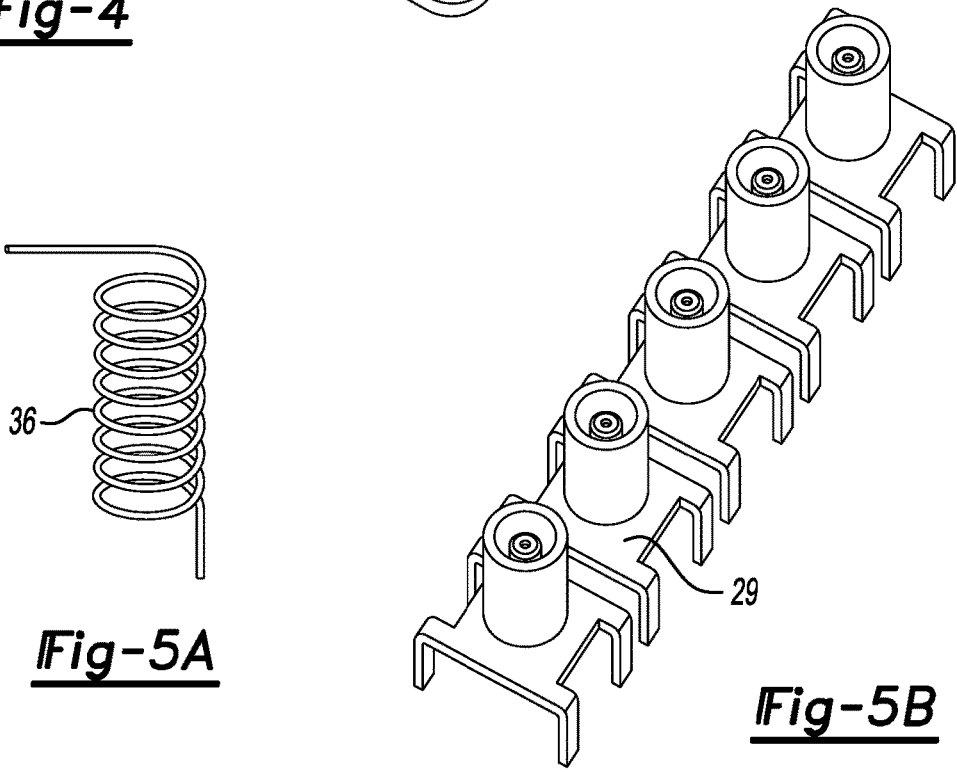
Fig-5A
Fig-5B

AUTOMATIC OPENING OF A CONNECTOR SELF-CLOSURE SYSTEM

CROSS-REFERENCE TO RELATED APPLICATIONS

This application claims the benefit of U.S. provisional Application No. 62/488,415 filed on Apr. 21, 2017, the disclosure of which is hereby incorporated by reference in its entirety herein.

TECHNICAL FIELD

Aspects disclosed herein generally relate to an automatic opening of a connector self-closure system. These aspects and others are contemplated in view of the disclosure as set forth herein.

BACKGROUND

U.S. Pat. No. 5,716,224 to Masuda et al. provides a connector that includes a first connector and a second connector which are fitted to each other to be electrically connected. One of the first and second connectors is provided with shutters each of which is pivotally moved outwardly upon application of an external force to a front surface portion of the respective shutters. The other connector is provided with front end portions, and during the time when the two connectors are fitted together, each of the front end portions urges the front surface portion of the associated shutter.

SUMMARY

In at least one embodiment, a connector assembly for being positioned on a vehicle is provided. The connector assembly includes a first connector portion and a second connector portion. The first connector portion defines a first channel and a second channel. Each of the first channel and the second channel are positioned on opposite sides of the first connector portion. The first connector portion includes a first contact member positioned within the first channel and a second contact member positioned with the second channel. The second connector portion includes a first shutter and a second shutter positioned on an outer surface of the second connector portion. Each of the first shutter and the second shutter are configured to receive the first contact member and the second contact member, respectively. Each of the first shutter and the second shutter pivot about an axis in response to receiving the first contact member and the second contact member, respectively, to enable the first connector portion to mate with the second connector portion.

In at least another embodiment, a vehicle antenna connector assembly is provided. The vehicle antenna connector assembly includes a first connector portion and a second connector portion. The first connector portion defines a first channel and a second channel. Each of the first channel and the second channel are positioned on opposite sides of the first connector portion. The first connection portion includes a first contact member positioned within the first channel and a second contact member positioned with the second channel. The second connector portion includes a first shutter and a second shutter positioned on an outer surface of the second connector portion. Each of the first shutter and the second shutter are configured to receive the first contact member and the second contact member, respectively. Each of the first shutter and the second shutter is pivotally coupled on an outer surface of the second connector portion. The first shutter and the second shutter pivot in response to receiving the first contact member and the second contact member, respectively, to enable the first connector portion to mate with the second connector portion.

In at least another embodiment, a connector assembly for being positioned on a vehicle is provided. The connector assembly includes a first connector portion, a second connector portion, and a wireless transmission device. The first connector portion defines a first channel and a second channel positioned on opposite sides of the first connector portion. The first connector portion includes a first contact member positioned within the first channel and a second contact member positioned with the second channel. The second connector portion includes a first shutter and a second shutter positioned on an outer surface of the second connector portion. Each of the first shutter and the second shutter are configured to receive the first contact member and the second contact member, respectively. Each of the first shutter and the second shutter pivot about an axis in response to receiving the first contact member and the second contact member, respectively, to enable the first connector portion to mate with the second connector portion. The wireless transmission device is configured to communicate with terminals of the first connector portion and the second connector portion to enable wireless transmission between the vehicle and at least one mobile device.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompanying drawings in which:

FIG. 4 depicts a second connector portion of the connector self-closure system in accordance to one embodiment;

FIGS. 5A-5E depict various components of the second connector portion of the connector self-closure system in accordance to one embodiment.

DETAILED DESCRIPTION

Figure 1A:
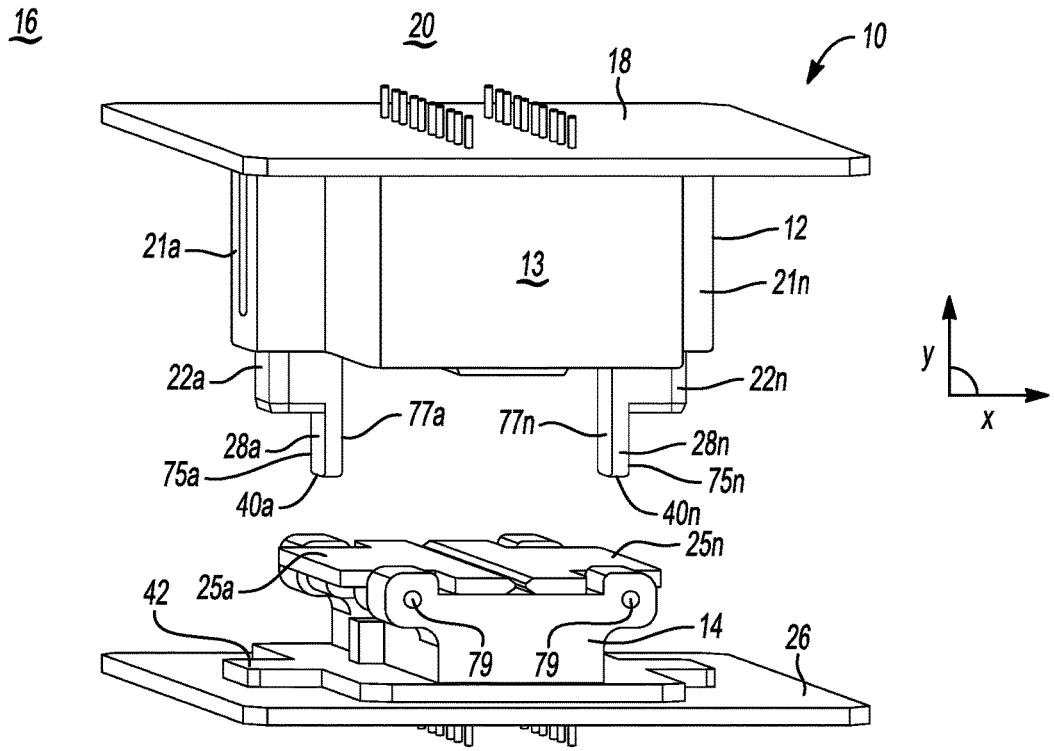
FIGS. 1A-1H are views of a connector self-closure system in accordance to one embodiment.
Figure 1B:
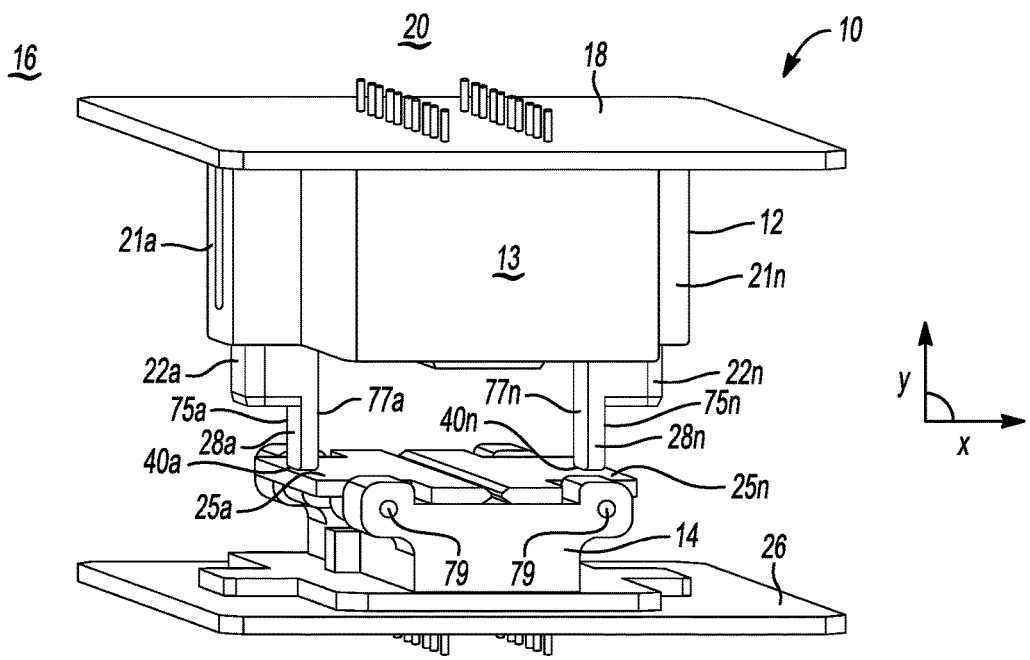
Figure 1C:
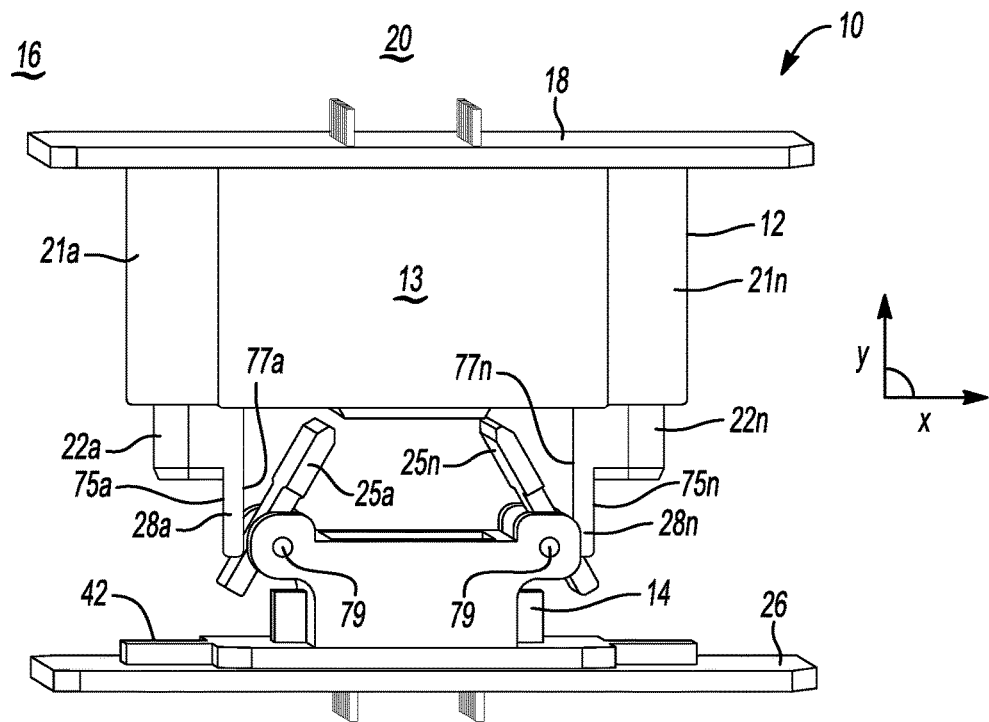
Figure 1D:
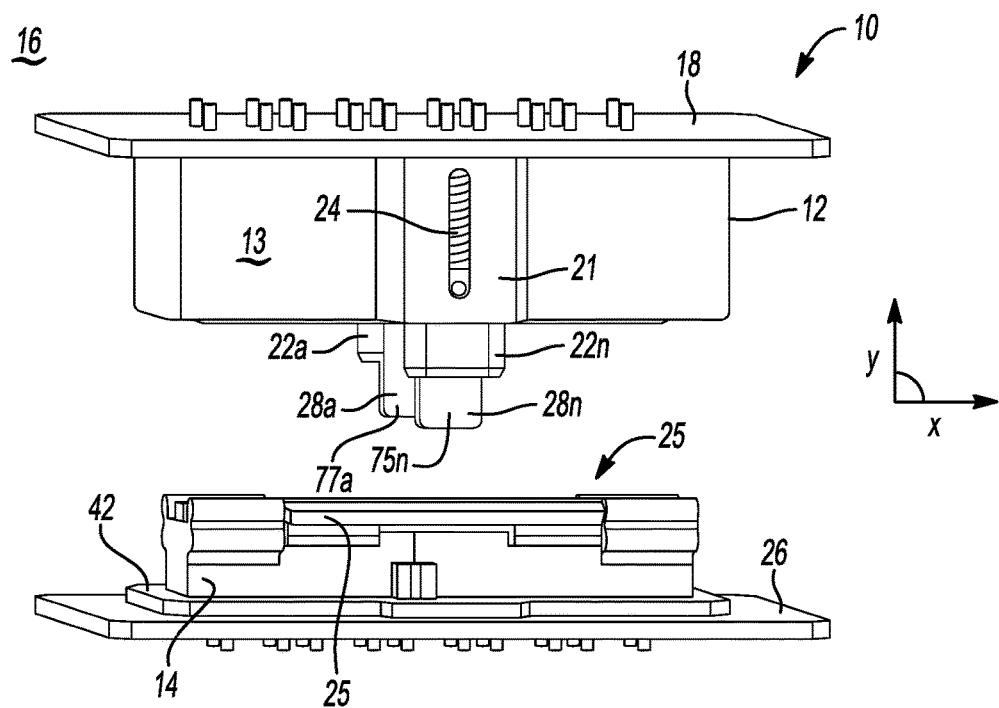
Figure 1E:
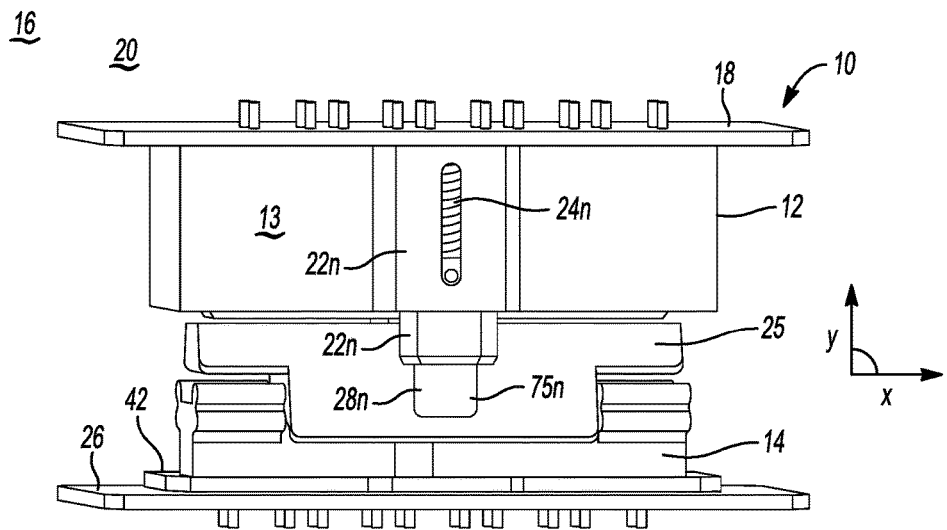

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1A-1H are views of a connector self-closure system 10 (hereafter "system 10") in accordance to one embodiment. The system 10 includes a first connector portion 12 and a second connector portion 14 that are enabled to mate with one another via terminals (not shown) positioned therein. The system 10 further includes a wireless transmission device 13 for enabling wireless transmission between a vehicle 16 and any number of mobile devices. For example, the wireless transmission device 13 may include any number of antennas, transmitters, transceivers (not shown), and/or other electronics to enable wireless communication such as, but not limited to, BLUETOOTH and cellular communication with the vehicle 16, etc. The wireless transmission device 13 may be positioned within the first connector portion 12. The particular antenna, receiver, and/or transceiver used and its corresponding wireless transmission capability may vary based on a desired criteria of a particular implementation.

The system 10 generally includes a first printed circuit board (PCB) 18 that is connected to the first connector portion 12. It is recognized that the entirety of the system 10 may be inserted in a housing 20 to protect the system 10. In some cases, the housing 20 in addition to the system 10 may be positioned on an exterior portion of the vehicle 16. The first connector portion 12 generally includes a plurality of first channels 21a-21n. The first connector portion 12 includes a plurality of contact members 22a-22n ("22") where each contact member 22 is positioned on opposite sides of the first connector portion 12 in a corresponding first channel 21 (see FIG. 1D for additional reference). Each contact member 22 is at least partially positioned within a corresponding first channel 21. The first connector portion 12 also includes a plurality of springs 24a-24n, where each spring 24 opposes a corresponding contact member 22 in a corresponding first channel 21. A plurality of first terminals 27 (see FIGS. 1D and 3A-3D) is positioned within the first connector portion 12. A plurality of second terminals 29 (see FIG. 4) is positioned within the second connector portion 14 to mate with the plurality of first terminals 27.

The second connector portion 14 generally includes a plurality of shutters (or protective members) 25a-25n ("25") that face toward a bottom side (or underside) of the of the first connector portion 12. Each shutter 25 is pivotally coupled to a top side of the second connector portion 14. A second PCB 26 is attached to an underside of the second connector portion 14. The plurality of shutters 25, when in a closed state, lies parallel to the second PCB 26. While it was noted above that each of the first connector portion 12 and the second connector portion 14 may be positioned in a housing 20, it is also recognized that a separate housing (not shown) may be used for the first connector portion 12 and the first PCB 18 and an additional separate housing (not shown) may be used for the second connector portion 14 and the second PCB 26. It is also contemplated that each of the first connector portion 12 and the second connector portion 14 may be part of a wire harness (not shown) that is directly wired to wires in the harness without the first PCB 18 and the second PCB 26. It is recognized that the various components that comprise the wireless transmission device 13 may be positioned on one or more of the first connector portion 12, the second connector portion 14, the first PCB 18, and the second PCB 26.

Figure 1F:
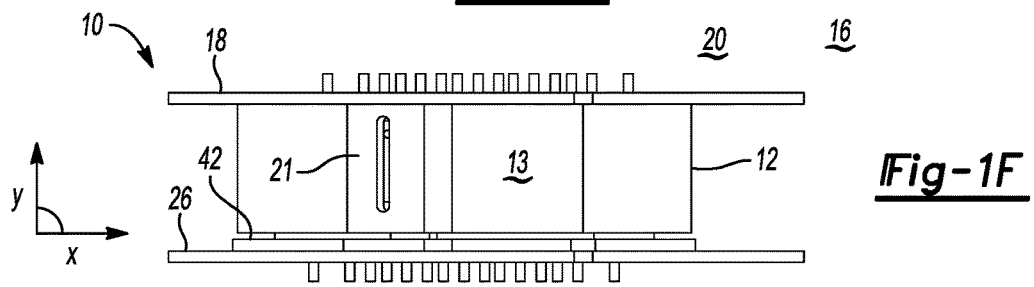
Figure 1G:
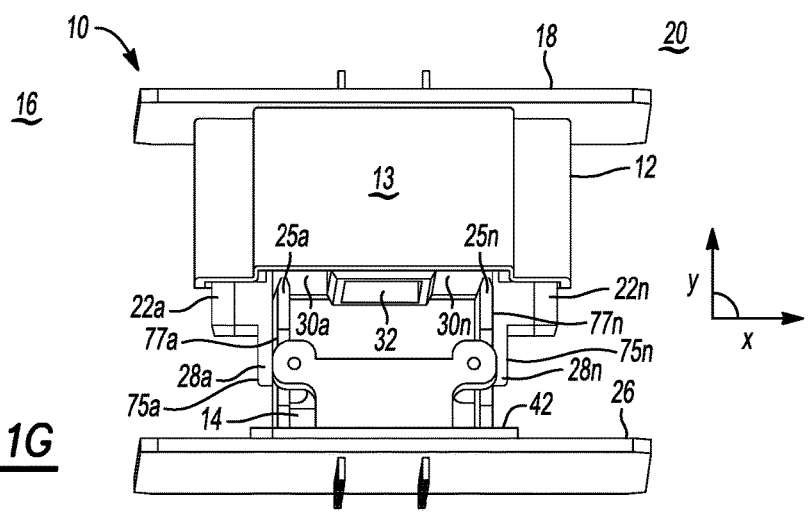
Figure 1H:
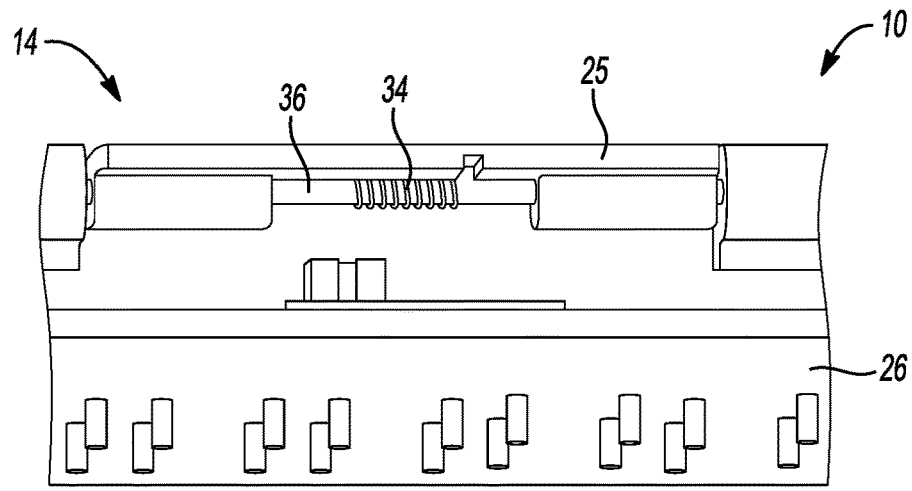
Figure 2:
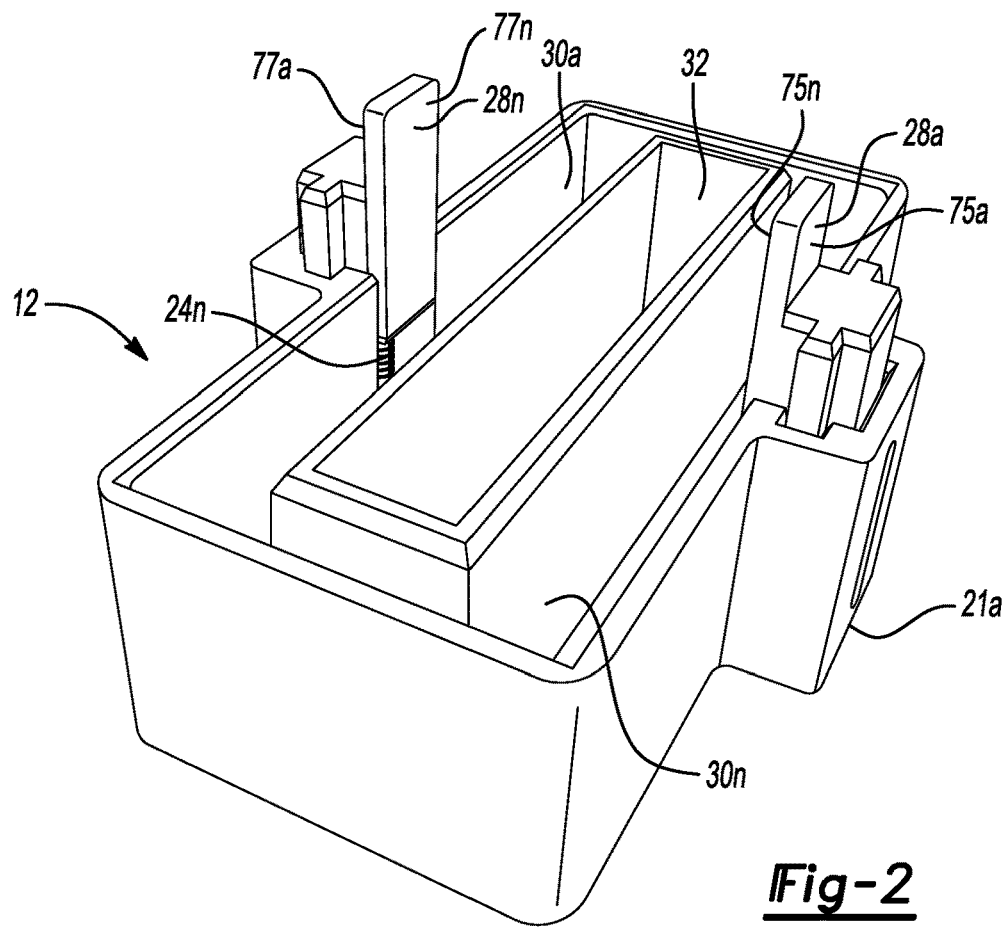
FIG. 2 depicts a first connection portion of the connector self-closure system in accordance to one embodiment.
Figure 3A:
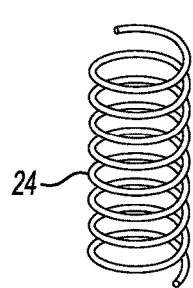
FIGS. 3A-3D depict various components of the first connector portion in accordance to one embodiment.
Figure 3B:
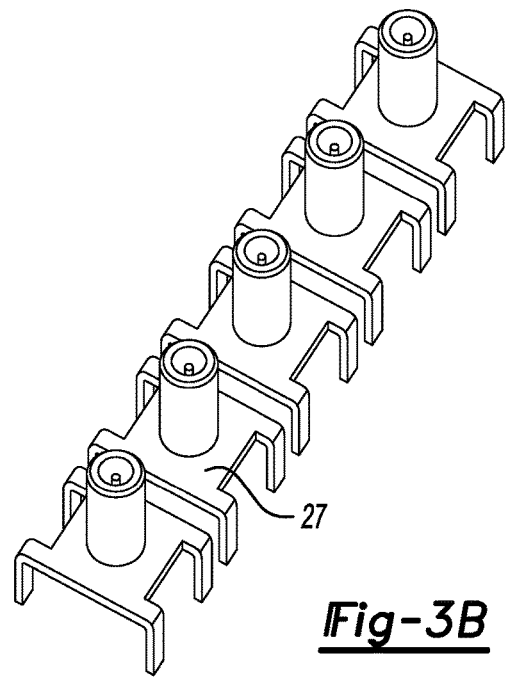
Figure 3C:
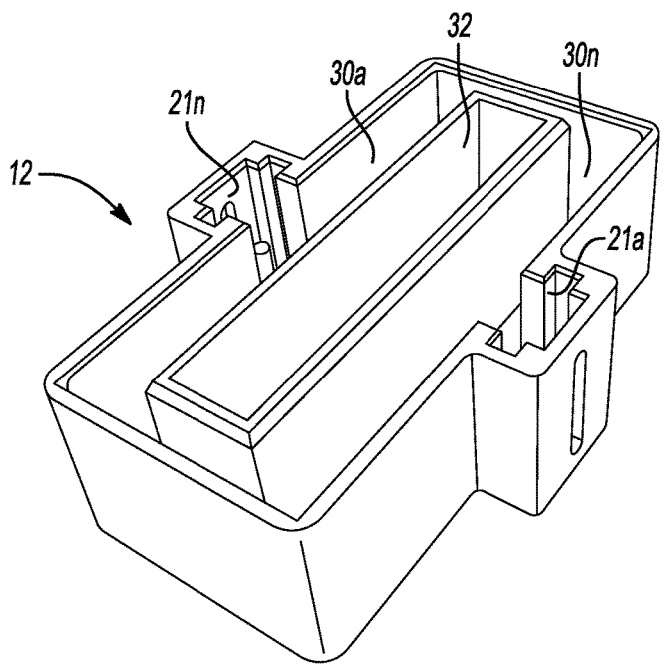
Figure 3D:
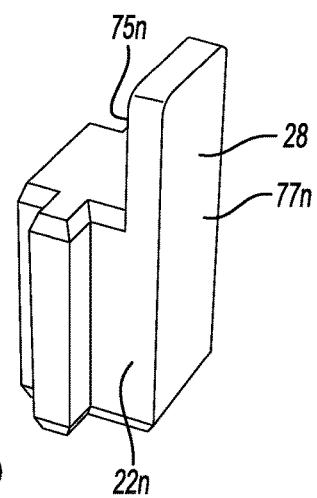
Figure 5C:
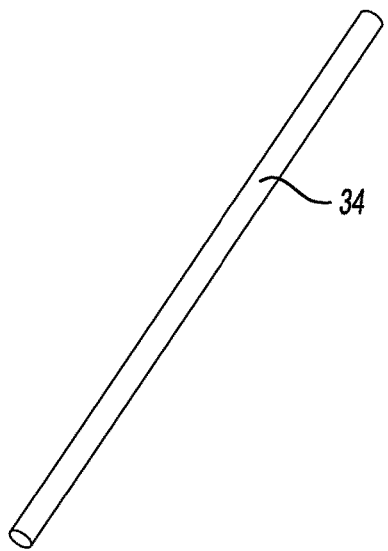
Figure 5D:
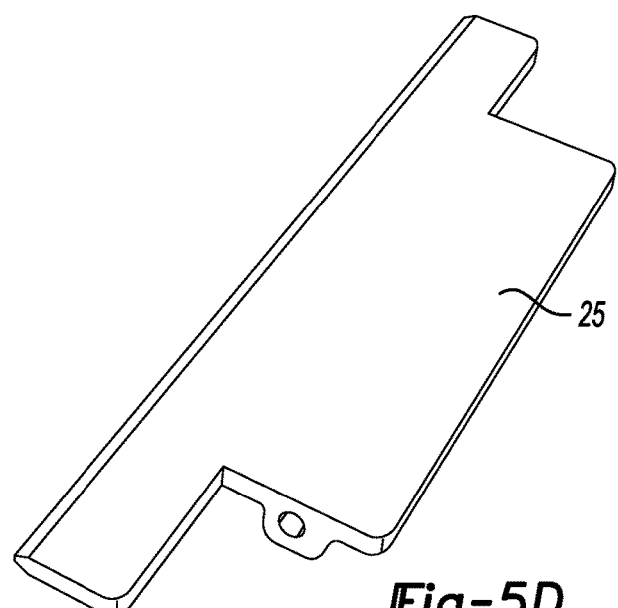
Figure 5E:
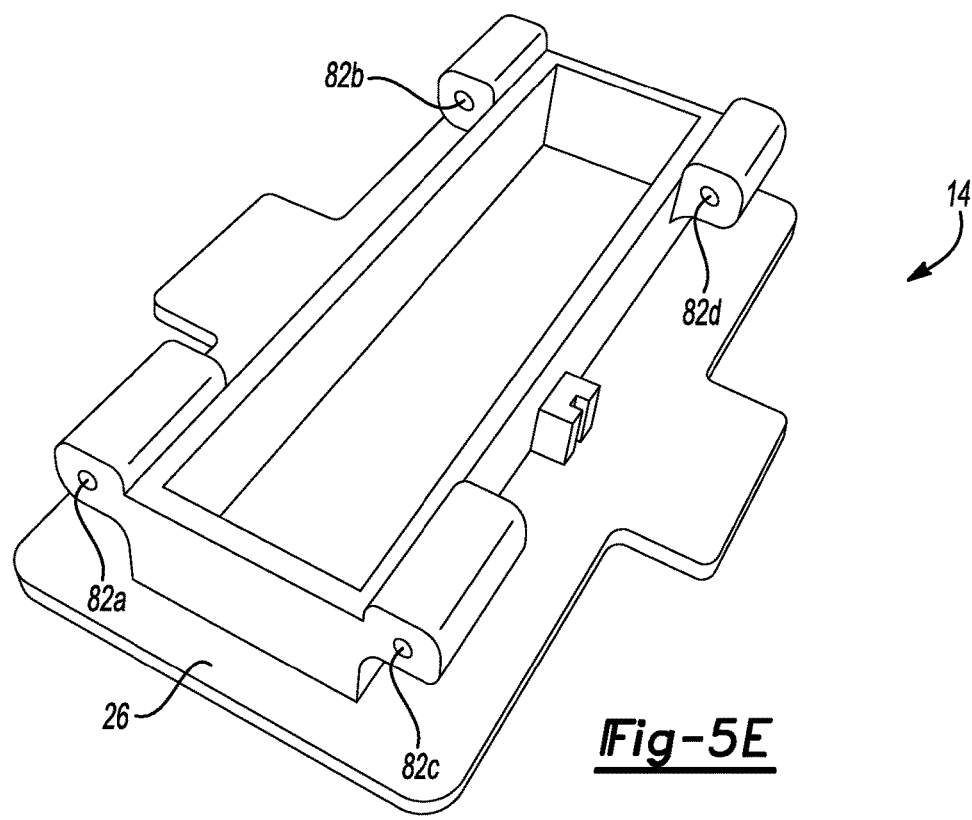

Each contact member 22 of the first connector portion 12 includes a first contactor member 28a or 28n ("28") to contact an outer edge of a corresponding shutter 25 as the first connector portion 12 is moved closer in relation to the second connector portion 14 for purposes of mating. The first contactor member 28a includes a top side portion 75a and an underside (or bottom side) portion 77a. The second contactor member 28n includes a top side portion 75n and an underside (or bottom side) portion 77n. In response to the first contactor member 28 contacting a corresponding shutter 25, each shutter 25 pivotally rotates upward toward an underside of the first connector portion 12 and toward the underside portions 77a and 77n of the first and the second contactor members 28a and 28n, respectively (see FIGS. 1B, 1C, 1E, and 1G). In addition, each spring 24 within the corresponding first channel 21 compresses to enable the corresponding contact member 22 to retract into the first channel 21. As can be seen in FIG. 1G, each shutter 25 lies parallel to a corresponding first contactor member 28. In this state, each shutter 25 is in a fully opened state. The underside portion 77 of each contact member 22 prevents a corresponding shutter 25 from pivoting any further toward the second PCB 26. As can be seen, each shutter 25 may rotate at an angle between zero (e.g., when the shutters 25 are closed) and 90 degrees (e.g., when the shutters 25 are fully opened and contacting the underside portions 77).

The bottom side of first connector portion 12 includes a plurality of second channels 30a-30n ("30") to receive each shutter 25 as the first connector portion 12 slides over the second connector portion 14. When the first connector portion 12 is mated to the second connector portion 14, the shutter 25a may be inserted and housed within the second channel 30a and the shutter 25n may be inserted and housed within the second channel 30n. As shown in FIG. 1F, the first connector portion 12 slides over the second connector portion 14 to enable the plurality of first terminals 27 to engage the plurality of second terminals 29. Each first contact member 28a-28n includes an abutting end 40a-40n, respectively, located at an end portion thereof. The first connector portion 12 also includes a first terminal cavity 32 that surrounds the plurality of first terminals 27. The first terminal cavity 32 is positioned between the second channels 30a and 30n. The second connector portion 14 includes a base 42 positioned directly above the second PCB 26. Each abutting end 40a-40n contacts the base 42 when the first connection portion 12 is mated to the second connector portion 14. The second connector portion 14 includes a pin 34 that couples each shutter 25 to the second connector portion 14. A spring 36 receives the pin 34 (see FIG. 1H and FIGS. 5A-5C).

The wireless transmission device 13 is configured to communicate with terminals of the first connector portion and the second connector portion to enable wireless transmission between the vehicle 16 and at least one mobile device. It is recognized that the plurality of first terminals 27 and the plurality of second terminals 29 may be generally low impedance terminals to enable wireless transmission for antennas of the vehicle 16. Thus, the first connector portion 12 may be generally arranged to prevent contamination buildup of the plurality of first terminals 27 by embedding the plurality of first terminals 27 within the cavity 32. In addition, the shutters 25 prevent contamination buildup on the plurality of second terminals 29 when the shutters 25 are in a closed state (i.e., shutters 25 are parallel to the second PCB 26). The shutters 25 are generally open while mating the first connector portion 12 to the second connector portion 14.

To mate the first connector portion 12 to the second connector portion 14, the following cooperative relationships are performed. For example, a user may place the first connector portion 12 directly over the second connector portion 14 and align each of the first contact member 28a and the second contact member 28n with outer ends of the first shutter 25a and the second shutter 25n. As the first contact member 28a contacts the first shutter 25a and the second contact member 28n contacts the second shutter 25n, each of the first shutter 25a and the second shutter 25n pivot about an axis 75. In this case, the first contact member 28a and the second contact member 28n compress against the spring 24 in response to contacting the base 42 and begin to retract into the first channels 21a and 21n, respectively.

Each of the first shutter 25a and the second shutter 25n may rotate at an angle between zero and 90 degrees as the first contact member 28a and the second contact member 28n exert a force and are pushed down onto the outer ends of the first shutter 25a and the second shutter 28n. The angle for each of the first shutter 25a and the second shutter 25n increases as the first contact member 28a and the second contact member 28n are pushed onto the outer ends (see FIG. 1C). In other words, the angle for each of the first shutter 25a and the second shutter 25n increases based on the amount of travel of the first contact member 28a and the second contact member 28n move downward in the y-axis (or vertical axis) (or the amount of travel the second contact member 28n moves upward in the y-axis). It is recognized that the first connector portion 12 and the second connector portion 14 may be mated by presenting the first connector portion 12 to the second connector portion 14 in the x-axis (or horizontal axis). The second channels receive each shutter 25 as the first connector portion 12 slides over the second connector portion 14. The underside portion 77 of each contact member 22 prevents a corresponding shutter 25 from pivoting past an angle of, for example, 90 degrees when the first connector portion 12 is mated to the second connector portion 14.

When removing the first connector portion 12 from the second connector portion 14, the shutter 25 pivots back toward the second connector portion 14 (i.e., the angle of the shutter 25 decreases). In addition, the spring 24 in each first channel 21 of the first connector portion 12 exerts a force against each contact member 28 to push each contact member 28 away from the first connector portion 12.

FIGS. 5A-5E depict various components of the second connector portion 14 of the connector self-closure system 10. As noted above, the second connector portion 14 includes the pin 34 that couples each shutter 25 to the second connector portion 14. The spring 36 receives the pin 34 (see FIG. 1H). The second connector portion 14 includes a plurality of axis holes 82a-82d for receiving a corresponding pin 34. Each shutter 25 pivots about the axis 79 when the pin 34 is inserted into a corresponding plurality of axis holes 82 (e.g., 82a-82b and 82c-82d). A single pin 34 is provided for each shutter 25.

Figure 6:
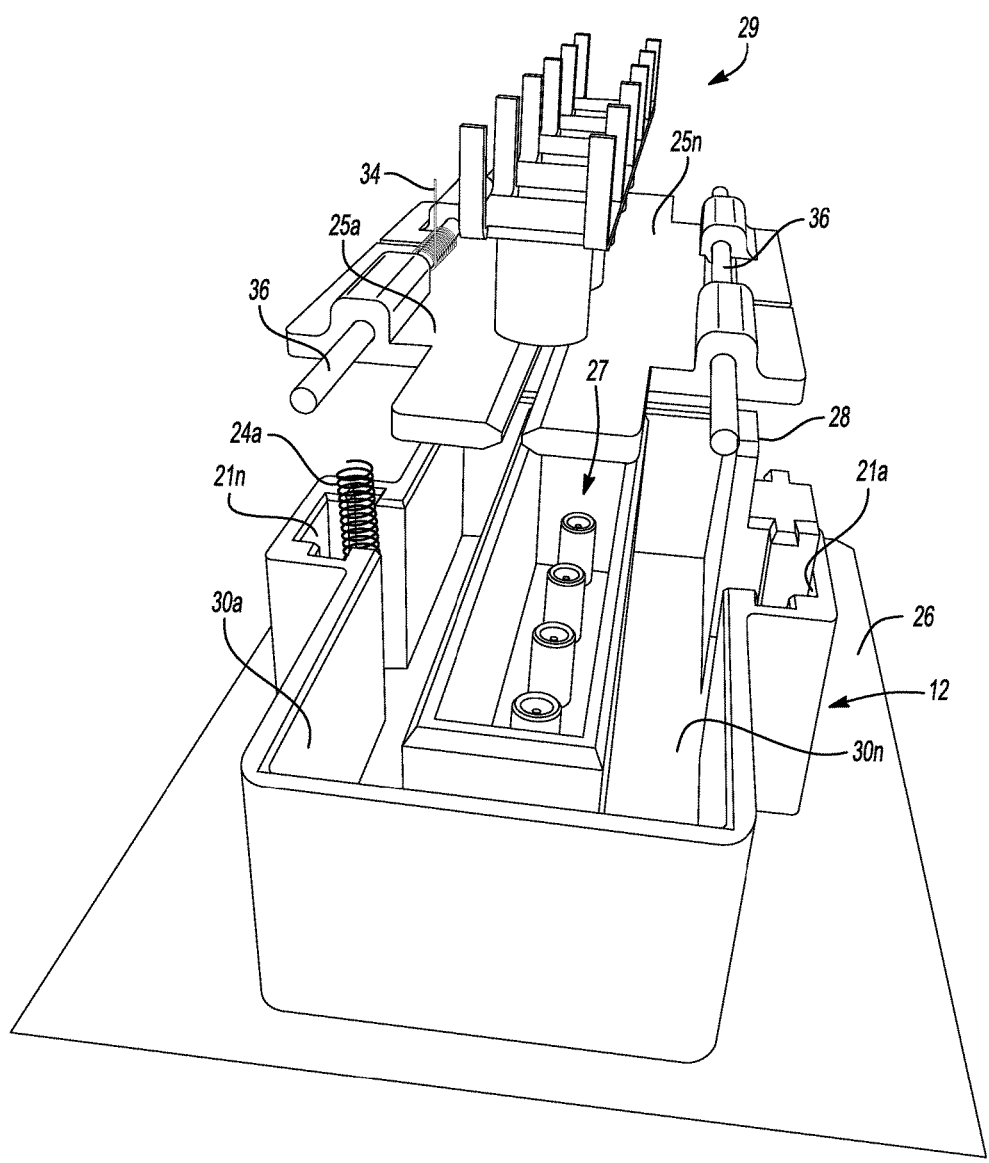
FIG. 6 depicts an interface between the first connector portion and the second connection portion in accordance to one embodiment.

FIG. 6 depicts an interface between the first connector portion 12 and the second connection portion 14 in accordance to one embodiment. The first terminal cavity 32 of the first connector portion 12 includes plurality of first terminals 27. As shown, portions of the first plurality of terminals 27 protrude through openings within the first terminal cavity 27. Rear end portions of the plurality of first terminals 27 are coupled and soldered to the first PCB 26. The plurality of first terminals 27 may be implemented as male terminals and is positioned over the plurality of second terminals 29 when the first connector portion 12 is mated to the second connector portion 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connector assembly for being positioned on a vehicle, the connector assembly comprising:
    a first connector portion defining a first channel and a second channel, each of the first channel and the second channel being positioned on opposite sides of the first connector portion, the first connector portion including:
        a first contact member positioned within the first channel; and
        a second contact member positioned with the second channel;
    a second connector portion including a first shutter and a second shutter positioned on an outer surface of the second connector portion;
        wherein each of the first shutter and the second shutter are configured to receive the first contact member and the second contact member, respectively; and
        wherein each of the first shutter and the second shutter pivot about an axis in response to receiving the first contact member and the second contact member, respectively, to enable the first connector portion to mate with the second connector portion; and
    a wireless transmission device configured to communicate with terminals of the first connector portion and the second connector portion to enable wireless transmission between the vehicle and at least one mobile device.

2. The connector assembly of claim 1 wherein each of the first contact member and the second contact member retracts within the first channel and the second channel, respectively, in response to each of the first shutter and the second shutter receiving the first contact member and the second contact member, respectively, when the first connector portion mates with the second connector portion.

3. The connector assembly of claim 1 further comprising a first spring positioned within the first channel and a second spring positioned within the second channel,
    wherein the first spring applies a first force against the first contact member to push the first contact member away from the first connector portion when disconnecting the first connector portion from the second connector portion, and
    wherein the second spring applies a second force against the second contact member to push the second contact member away from the second connector portion when disconnecting the first connector portion from the second connector portion.

4. The connector assembly of claim 1, wherein the first connector portion is coupled to a first printed circuit board (PCB) on an outer surface thereof.

5. The connector assembly of claim 4, wherein the second connector portion is coupled to a second PCB on an outer surface thereof.

6. The connector assembly of claim 5, wherein the wireless transmission device is positioned in at least one of the first connector portion, the second connector portion, the first PCB, and the second PCB to enable the wireless transmission between the vehicle and the at least one mobile device.

7. The connector assembly of claim 1, wherein the first connector portion further defines a third channel and a fourth channel to receive the first shutter and the second shutter, respectively, when the first connector portion is mated to the second connector portion.

8. The connector assembly of claim 7, wherein each of the first contact member and the second contact member includes a top side and a bottom side, and wherein the first shutter contacts the bottom side of the first contact member when the first connector portion is mated to the second connector portion, and
wherein the second shutter contacts the bottom side of the second contact member when the first connector portion is mated to the second connector portion.

9. The connector assembly of claim 7, wherein first connector portion defines a first terminal cavity to store a plurality of first terminals and wherein the first connector portion is positioned in between the third channel and the fourth channel.

10. The connector assembly of claim 7, wherein the third channel is positioned directly adjacent to the first channel and the fourth channel is positioned directly adjacent to the second channel.

11. A vehicle antenna connector assembly comprising:
a first connector portion defining a first channel and a second channel, each of the first channel and the second channel being positioned on opposite sides of the first connector portion, the first connector portion including:
a first contact member positioned within the first channel;
a second contact member positioned with the second channel; and
a second connector portion including a first shutter and a second shutter positioned on an outer surface of the second connector portion,
wherein each of the first shutter and the second shutter are configured to receive the first contact member and the second contact member, respectively; and
wherein each of the first shutter and the second shutter is pivotally coupled on an outer surface of the second connector portion,
wherein the first shutter and the second shutter pivot in response to receiving the first contact member and the second contact member, respectively, to enable the first connector portion to mate with the second connector portion,
wherein the first connector portion is coupled to a first printed circuit board (PCB) on an outer surface thereof, and
wherein the second connector portion is coupled to a second PCB on an outer surface thereof.

12. The connector assembly of claim 11 wherein each of the first contact member and the second contact member retracts within the first channel and the second channel, respectively, in response to each of the first shutter and the second shutter receiving the first contact member and the second contact member, respectively, when the first connector portion mates with the second connector portion.

13. The connector assembly of claim 11 further comprising a first spring positioned within the first channel and a second spring positioned within the second channel,
wherein the first spring applies a first force against the first contact member to push the first contact member away from the first connector portion when disconnecting the first connector portion from the second connector portion, and
wherein the second spring applies a second force against the second contact member to push the second contact member away from the second connector portion when disconnecting the first connector portion from the second connector portion.

14. The connector assembly of claim 11, wherein the first connector portion further defines a third channel and a fourth channel to receive the first shutter and the second shutter, respectively, when the first connector portion is mated to the second connector portion.

15. The connector assembly of claim 14, wherein each of the first contact member and the second contact member includes a top side and a bottom side, and wherein the first shutter contacts the bottom side of the first contact member when the first connector portion is mated to the second connector portion, and
wherein the second shutter contacts the bottom side of the second contact member when the first connector portion is mated to the second connector portion.

16. The connector assembly of claim 14, wherein first connector portion defines a first terminal cavity to store a plurality of first terminals and wherein the first connector portion is positioned in between the third channel and the fourth channel.

17. The connector assembly of claim 14, wherein the third channel is positioned directly adjacent to the first channel and the fourth channel is positioned directly adjacent to the second channel.

18. A connector assembly for being positioned on a vehicle, the connector assembly comprising:
a first connector portion defining a first channel and a second channel positioned on opposite sides of the first connector portion, the first connector portion including:
a first contact member positioned within the first channel;
a second contact member positioned with the second channel;
a second connector portion including a first shutter and a second shutter positioned on an outer surface of the second connector portion,
wherein each of the first shutter and the second shutter are configured to receive the first contact member and the second contact member, respectively; and
wherein each of the first shutter and the second shutter pivot about an axis in response to receiving the first contact member and the second contact member, respectively, to enable the first connector portion to mate with the second connector portion; and
a wireless transmission device configured to communicate with terminals of the first connector portion and the second connector portion to enable wireless transmission between the vehicle and at least one mobile device.

* * * * *